(12) United States Patent
Chikkali et al.

(10) Patent No.: US 10,843,179 B2
(45) Date of Patent: Nov. 24, 2020

(54) SELF-ASSEMBLED CATALYSTS AND USE THEREOF IN OLEFIN POLYMERIZATION

(71) Applicant: Council of Scientific & Industrial Research, New Delhi (IN)

(72) Inventors: Samir Hujur Chikkali, Maharashtra (IN); Nilesh Rajesh Mote, Maharashtra (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 116 days.

(21) Appl. No.: 16/320,435

(22) PCT Filed: Jul. 28, 2017

(86) PCT No.: PCT/IN2017/050310
§ 371 (c)(1),
(2) Date: Jan. 24, 2019

(87) PCT Pub. No.: WO2018/020515
PCT Pub. Date: Feb. 1, 2018

(65) Prior Publication Data
US 2019/0262818 A1    Aug. 29, 2019

(30) Foreign Application Priority Data
Jul. 28, 2016  (IN) .................. IN201611025820

(51) Int. Cl.
| | | |
|---|---|---|
| B01J 31/24 | (2006.01) | |
| B01J 37/04 | (2006.01) | |
| C08F 4/70 | (2006.01) | |
| C08F 10/02 | (2006.01) | |
| C08F 10/06 | (2006.01) | |
| C08F 10/08 | (2006.01) | |
| C08F 10/14 | (2006.01) | |
| C08F 20/18 | (2006.01) | |

(Continued)

(52) U.S. Cl.
CPC ............ $B01J\ 31/248$ (2013.01); $B01J\ 37/04$ (2013.01); $C08F\ 4/7062$ (2013.01); $C08F\ 4/80$ (2013.01); $C08F\ 10/02$ (2013.01); $C08F\ 10/06$ (2013.01); $C08F\ 10/08$ (2013.01); $C08F\ 10/14$ (2013.01); $C08F\ 20/18$ (2013.01); $C08F\ 32/00$ (2013.01); $C08F\ 110/02$ (2013.01); $B01J\ 2231/12$ (2013.01); $B01J\ 2531/44$ (2013.01); $B01J\ 2531/847$ (2013.01); $B01J\ 2531/90$ (2013.01); $B01J\ 2540/442$ (2013.01)

(58) Field of Classification Search
None
See application file for complete search history.

(56) References Cited

FOREIGN PATENT DOCUMENTS

WO    2009091334 A1    7/2009

OTHER PUBLICATIONS

Organometallics, 25(4), 954-960 (Year: 2006).*

(Continued)

*Primary Examiner* — Yun Qian
(74) *Attorney, Agent, or Firm* — Cantor Colburn LLP

(57) ABSTRACT

The present invention relates to a self assembled catalyst. More particularly, the present invention relates to a self-assembled catalyst of formula (I) comprising supramolecular phosphine and carboxylate ligands, process for preparation thereof and use of said catalyst of formula (I) in olefin polymerization.

9 Claims, 8 Drawing Sheets

(51) Int. Cl.
  C08F 32/00     (2006.01)
  C08F 4/80      (2006.01)
  C08F 110/02    (2006.01)

(56) References Cited

OTHER PUBLICATIONS

Boulens et al., "Self-Assembled Organometallic Nickel Complexes as Catalysts for Selective Dimerization of Ethylene into 1-Butene," Organometallics, (2015) 34(7): 1139-1142.

Duckmanton et al., "Palladium and Rhodium Ureaphosphine Complexes: Exploring Structural and Catalytic Consequences of Anion Binding," Inorganic Chemistry, (2005) 44(22): 7708-7710.

International Search Report and Written Opinion; International Application No. PCT/IN2017/050310; International Filing Date—Jul. 28, 2017; dated Jan. 23, 2018; 15 pages.

Knight et al., "Supramolecular Trans-Coordinating Phosphine Ligands," Organometallics, (2006) 25(8):954-960.

Koshti et al., "Highly Enantioselective Pd-Catalyzed Synthesis of P-Stereogenic Supramolecular Phosphines, Self-Assembly, and Implication," Organometallics (2015) 34(20): 4802-4804.

Wu et al., "Ethylene Polymerization and Copolymerization by Palladium and Nickel Catalysts Containing Naphthalene-Bridged Phosphine-Sulfonate Ligands," Organometallics (2016) 35(10): ,1472-1479.

Gellrich et al., "Mechanistic Insights into a Supramolecular Self-Assembling Catalyst System: Evidence for Hydrogen Bonding during Rhodium-Catalyzed Hydroformylation," (2012) Angew. Chem. Int. Ed., V. 51, pp. 11033-11038.

Weis et al., "Self-Assembly of Bidentate Ligands for Combinatorial Homogeneous Catalysis: Asymmetric Rhodium-Catalyzed Hydrogenation," (2006), J. Am. Chem. Society vol. 128, No. 13, pp. 4188-4189.

* cited by examiner

SELF-ASSEMBLED CATALYSTS AND USE THEREOF IN OLEFIN POLYMERIZATION

CROSS REFERENCE TO RELATED APPLICATIONS

This application is a National Stage application of PCT/IN2017/050310, filed Jul. 28, 2017, which claims priority to India Application No. 201611025820 filed Jul. 28, 2016, and all the benefits accruing therefrom under 35 U.S.C. § 119, the content of which is incorporated by reference in its entirety.

FIELD OF THE INVENTION

The present invention relates to a self-assembled catalyst. More particularly, the present invention relates to a self-assembled catalyst of formula (I) comprising supramolecular phosphine and carboxylate ligands, process for preparation thereof and use of said catalyst of formula (I) in olefin polymerization.

BACKGROUND AND PRIOR ART

Polyolefins are raw materials used in a wide range of industries, including packaging, automotives and construction. Therefore, the production of polyolefins is a very important branch of industry. The catalysts for olefin polymerization play a key role in the production process, which has led to much work in this area of research. The catalysts for olefin polymerization play a key role in the preparation process, resulting in the development of highly efficient olefin polymerization catalysts. After the traditional highly efficient multi-site Ziegler-Natta catalysts, such as $TiCl_n$/$MgCl_2$ (n=3.4), and single-site group-4 metallocene catalysts have been extensively studied and applied in industry, in the past decade much attention has been paid to non-cyclopentadienyl single-site catalysts using heteroatom coordination, such as N, O atoms that have attracted much interests. To date several highly efficient catalysts have been identified, such as α-diimine-Ni (II)/Pd(II), 2,6-diiminopyridine-Fe(II), phenoxy-imine-Ni and phenoxy-imine-Ti/Zr catalysts.

Bidentate ligands play a prominent role in homogeneous catalysis and out perform their monodentate counterparts, with few exceptions. The enhanced regio- and stereo-selection can be attributed to the chelating ability of bidentate ligands and enforcement of a confined environment around the metals center. These attributes provide a better discrimination between the two faces of incoming substrate and lead to enhanced selectivities. However, synthesis of bidentate ligands is largely a tedious, multistep and time consuming process. This is especially inconvenient if a large ligand library has to be screened to meet the desired selectivity. Although combinatorial approaches have been designed to exactly address this bottle neck, they usually make use of covalently synthesized ligands and suffer from the lack of ligand libraries.

Article titled "Supramolecular trans-Coordinating Phosphine Ligands" by LK Knight et al. published in *Organometallics*, 2006, 25 (4), pp 954-960 reports a new urea-functionalized phosphorus ligand and palladium complexes thereof that self-associate by hydrogen bond formation. The solution studies of a urea-based phosphine ligand {m-[EtO(CO)CH$_2$NH(CO)NH]C$_6$H$_4$PPh$_2$}, 1, and the palladium complex (1)$_2$PdMeCl, 2, show that intermolecular and intramolecular hydrogen-bonding, respectively, is present between the urea hydrogens and the carbonyl of a second urea moiety.

Article titled "Palladium and Rhodium Ureaphosphine Complexes: Exploring Structural and Catalytic Consequences of Anion Binding" by P A Duckmanton et al. published in *Inorg. Chem.*, 2005, 44 (22), pp 7708-7710 reports that the addition of a chloride ion to Pd and Rh complexes supported by the ureaphosphine ligand L results in the formation of chelating diphosphine complexes that retain some catalytic activity.

Article titled "Highly Enantioselective Pd-Catalyzed Synthesis of P-Stereogenic Supramolecular Phosphines, Self-Assembly, and Implication" by V S Koshti et al. published in *Organometallics*, 2015, 34 (20), pp 4802-4805 reports P-stereogenic supramolecular phosphines which are found to self-assemble on a metal template to produce self-assembled metal complexes.

Article titled "Mechanistic Insights into a Supramolecular Self-Assembling Catalyst System: Evidence for Hydrogen Bonding during Rhodium-Catalyzed Hydroformylation" by U Gellrich et al. published in *Angewandte Chemie*, 2012, 124 (44), pp 11195-11200 reports that the hydrogen bonding network of the 6-DPPon (3) system enhances the activity and selectivity of the hydroformylation of 1-octene. The hydrogen bonding provides a synergism of flexibility and structural integrity which facilitates the adoption of different coordination geometries without a significant energy penalty whilst maintaining the region discriminating properties of a chelating ligand.

Article titled "Self-Assembly of bidentate ligands for combinatorial homogeneous catalysis: asymmetric rhodium-catalyzed hydrogenation" by M Weis et al. published *J. Am. Chem. Soc.*, 2006, 128 (13), pp 4188-4189 reports self-assembly through complementary hydrogen-bonding from a 10×4 ligand library, catalysts that show excellent activity and enantio-selectivity for the asymmetric rhodium-catalyzed hydrogenation.

Article titled "Ethylene polymerization and copolymerization by palladium and nickel catalysts containing naphthalene-bridged phosphine-sulfonate ligands' by Z Wu et al. published in *Organometallics*, 2016, 35 (10), pp 1472-1479 reports a series of naphthalene-bridged phosphine-sulfonate ligands and the corresponding Pd(II) complexes [κ$^2$(P,O)-2-(R$_2$P)-1-naphthalenesulfonato]Pd(Me)(dmso) (1, R=Ph; 2, R=o-MeO-C$_6$H$_4$; 3, R=Cy) and Ni(II) complexes [κ$^2$(P, O)-2-(R$_2$P)-1-naphthalenesulfonato]Ni(η$^3$-C$_3$H$_5$) (Ni-1, R=o-MeO—C$_6$H$_4$; Ni-2, R=Cy). In ethylene polymerization, complex 2 showed activity of up to 7.5×10$^6$ g mol$^{-1}$ h$^{-1}$, which is among the most active palladium catalyst for ethylene homopolymerization.

Apart from the traditional molecular catalysis, the field of (functional) olefin (co)polymerization is dominated by a bidentate phosphine-sulfonate ligand system for about two decades. But the synthesis of phosphine-sulfonate requires multiple steps (5 steps) and the net/overall yield is at the best very low. Bidentate ligands are disclosed by multi step synthesis and with covalent bonding.

Therefore there is need, if such ligands are prepared in a single step using the non-covalent interactions. Accordingly, the present inventors provides a novel a self-assembled catalyst of formula (I), simple one pot process for the preparation of the same and use of said supramolecular ligand system in olefin polymerization.

OBJECTIVE OF THE INVENTION

The main objective of the present invention is to provide a self-assembled catalyst of formula (I).

Another objective of the present invention is to provide a one pot process for the preparation of self-assembled catalyst of formula (I).

Yet another objective of the present invention is to provide a process for olefin polymerization by using self-assembled catalyst of formula (I).

SUMMARY OF THE INVENTION

In an embodiment, the present invention provides a self-assembled catalyst of formula (I);

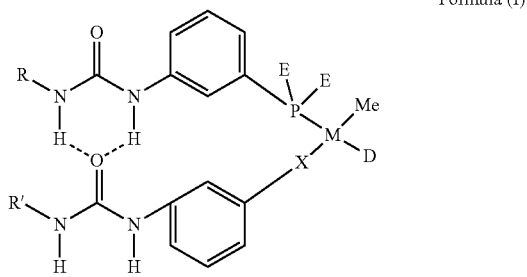

Formula (I)

Wherein;
M is selected from Pd or Ni;
X is selected from $SO_3^-$, $CO_2^-$ or $O^-$;
R and R' is selected from H or Ph;
D is selected dimethyl sulfoxide, pyridine, lutidine, acetonitrile, dimethylformamide, acetone, benzonitrile, triphenylphosphine, triphenylphosphineoxide, pyridone or piperidine;
E is selected from hydrogen, alkyl, cycloalkyl, aryl, mono or disubstituted aryl.

In preferred embodiment, said E is selected from cyclohexane, 2-methoxybenzene, 2-ethoxybenzene, 2-methylbenzene, 2-ethylbenzene, 2,6-dimethoxybenzene, 2-isopropylbenzene, 2-t-butylbenzene, 2,6-diflurobenzene, 3,5-triflurobenzene or pentaflurobenzene.

In another preferred embodiment, said self-assembled catalyst of formula (I) is selected from [{(3-ureidobenzoate O)methyl(1-(3-(diphenylphosphanyl)phenyl)urea)} Palladium] (4), [{(3-ureidobenzoate O)methyl(1-(3-(diphenylphosphanyl)phenyl)urea) dimethyl sulfoxide} Palladium] (4') or [{(3-ureidobenzoate O)methyl(1-(3-(diphenylphosphanyl)phenyl)urea) pyridine} Palladium] (5).

In another embodiment, the present invention provides a one-pot process for the preparation of self-assembled catalyst of formula (I) comprising the steps of:
a) Adding potassium cyanate dissolved in water to the reaction mixture of aniline compound dissolved in hydrochloric acid and diluted with water followed by stirring at temperature in the range of 28 to 35° C. for the period in the range of 12 to 40 hours to afford 1-(3-iodophenyl)urea;
b) Adding diphenylphosphine and triethylamine to the solution of compound of step (a) in solvent followed by refluxing the reaction mixture in presence of a catalyst at temperature in the range of 69 to 72° C. for the period in the range of 16 to 18 hrs;
c) Adding potassium cyanate dissolved in water to the reaction mixture of acid compound dissolved in hydrochloric acid and diluted with water followed by stirring at temperature in the range of 28 to 35° C. for the period in the range of 12 to 40 hours to afford carboxylate ligand;
d) Adding metal compound and ligand of step (b) to the carboxylate ligand of step (c) followed by stirring the reaction mixture at room temperature in the range of 28 to 35° C. for the period in the range of 1 to 16 hours to afford self-assembled catalyst of formula (I).

In another embodiment, the present invention provides a one pot process for the preparation of self-assembled catalyst of formula (I) comprising the steps of:
a) adding potassium cyanate dissolved in water to the reaction mixture of aniline compound dissolved in hydrochloric acid and diluted with water followed by stirring at temperature in the range of 28 to 35° C. for the period in the range of 12 to 40 hours to afford 1-(3-iodophenyl)urea;
b) adding diphenylphosphine and triethylamine to the solution of compound of step (a) in solvent followed by refluxing the reaction mixture in presence of [Pd (OAc)$_2$] as a catalyst at temperature in the range of 69 to 72° C. for the period in the range of 16 to 18 hrs;
c) adding potassium cyanate dissolved in water to the reaction mixture of acid compound dissolved in hydrochloric acid and diluted with water followed by stirring at temperature in the range of 28 to 35° C. for the period in the range of 12 to 40 hours to afford carboxylate ligand;
d) adding [Pd(COD)MeCl] and ligand of step (b) to the carboxylate ligand of step (c) followed by stirring the reaction mixture at room temperature in the range of 28 to 35° C. for the period in the range of 1 to 16 hours to afford self-assembled catalyst of formula (I).

In preferred embodiment, said solvent in step (b) is selected from Tetrahydrofuran (THF), Dimethylformamide (DMF) or mixture thereof.

In another preferred embodiment, said aniline compound in step (a) is selected from 3-Iodoaniline, 3-Bromoaniline or 3-Chloroaniline.

In yet another preferred embodiment, said acid compound in step (c) is selected from metanilic acid, substituted metanilic acid, 3-amino benzoic acid or substituted 3-amino benzoic acid. The substituent is selected from alkyl, cycloalkyl, halo-substituted alkyl, halo-substituted cycloalkyl, an aryl or halo-substituted aryl or heteroatom substituted halo-aryl.

In still another preferred embodiment, said carboxylate ligand is selected from 3-ureidobenzoic acid (2b) or 3-(3-phenylureido) benzoic acid.

In yet still another preferred embodiment, said metal compound is selected from [Pd(COD)MeCl], [Pd(TMEDA) Me$_2$], [Ni(COD)MeCl], [Ni(TMEDA)Me$_2$] or [Ni(PPh$_3$)$_2$ PhCl].

In yet still another preferred embodiment, said carboxylate ligand in step (d) is optionally treated with sodium hydride in Tetrahydrofuran (THF) for 3 to 4 hours at room temperature in the range of 20 to 35° C., followed by dissolved in Dimethyl sulfoxide (DMSO).

In yet still another preferred embodiment, said step (d) optionally treated with sodium hydride in THF for 3 to 4 hours followed by dissolved in pyridine.

In yet still another preferred embodiment, said catalyst in step (b) is selected from [Pd(OAc)$_2$], [Pd(OBz)$_2$], [Pd(OTf)] or [Pd(OTs)].

In yet another embodiment, the present invention provides a process for olefin polymerization comprising the steps of: mixing a monomer component comprising one or more polymerizable olefins and an self-assembled catalyst of formula (I) in solvent at a temperature in the range of 30 to 90° C. and at pressure in the range of 1 to 20 bars in a high pressure reactor to afford desired polymer.

In preferred embodiment, said olefins is selected from $C_2-C_{30}$ α-olefins, $C_2-C_{30}$ functionalized alkenes, cycloalkenes, norborene and derivatives thereof, dienes, acetylenes, styrene, alkenols, alkenoic acids and derivatives or mixtures thereof.

In another preferred embodiment, said olefin is ethylene, propylene, butene, pentene, hexene, 4-methyl-1-pentene, octene, norborene or methacrylate.

In yet another preferred embodiment, said solvent is selected from, toluene, xylene, heptane, octane, decane or dodecane.

Abbreviations Used

DMSO: Dimethylsulfoxide
DMF: Dimethylformamide
THF: Tetrahydrofuran
[Pd(OAc)$_2$]: Palladium Acetate
[Pd(OBz)$_2$]: Palladium Benzoate
[Pd(OTf)]: Palladium Triflate
[Pd(OTs)]: Palladium Tosylate

BRIEF DESCRIPTION OF THE DRAWINGS

FIG. 6a: DEPT-NMR spectrum of complex [PdMe(2b)(1a)(Py)] (5).
FIG. 6b: HSQC spectrum of complex [PdMe(2b)(1a)(Py)] (5).

DETAILED DESCRIPTION OF THE INVENTION

Figure 1A:
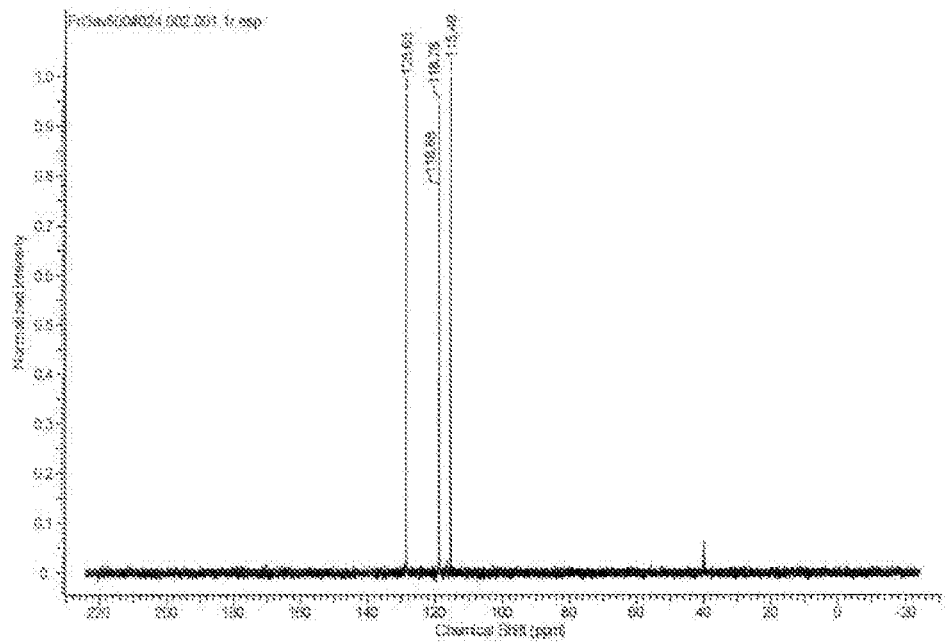
FIG. 1a: DEPT-NMR of ligand 3-ureidobenzenesulfonic acid (2a).

The invention will now be described in detail in connection with certain preferred and optional embodiments, so that various aspects thereof may be more fully understood and appreciated.

In line with the above objectives, the present invention provides a self-assembled catalyst of formula (I) comprising supramolecular phosphine and carboxylate ligands, process for preparation thereof and use of said catalyst in olefin polymerization.

In an embodiment, the present invention provides a self-assembled catalyst of formula (I);

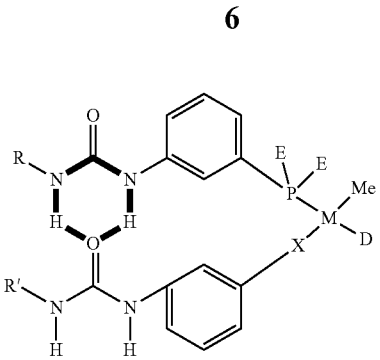

Formula (I)

Wherein;
M is selected from Pd or Ni;
X is selected from $SO_3^-$, $CO_2^-$ or $O^-$;
R and R' is selected from H or Ph;
D is selected from dimethyl sulfoxide, pyridine, lutidine, acetonitrile, dimethylformamide, acetone, benzonitrile, triphenylphosphine, triphenylphosphineoxide, pyridone or piperidine;
E is selected from hydrogen, alkyl, cycloalkyl, aryl, mono or disubstituted aryl.

In preferred embodiment, said E is selected from cyclohexane, 2-methoxybenzene, 2-ethoxybenzene, 2-methylbenzene, 2-ethylbenzene, 2,6-dimethoxybenzene, 2-isopropylbenzene, 2-t-butylbenzene, 2,6-difluorobenzene, 3,5-triflurobenzene or pentaflurobenzene.

In another preferred embodiment, said self-assembled catalyst of formula (I) is selected from [{(3-ureidobenzoate O)methyl(1-(3-(diphenylphosphanyl)phenyl)urea)} Palladium] (4), [{(3-ureidobenzoate O)methyl(1-(3-(diphenylphosphanyl)phenyl)urea) dimethyl sulfoxide} Palladium] (4') or [{(3-ureidobenzoate O)methyl(1-(3-(diphenylphosphanyl)phenyl)urea) pyridine} Palladium] (5).

In another embodiment, the present invention provides a one-pot process for the preparation of self-assembled catalyst of formula (I) comprising the steps of:
a) Adding potassium cyanate dissolved in water to the reaction mixture of aniline compound dissolved in hydrochloric acid and diluted with water followed by stirring at temperature in the range of 28 to 35° C. for the period in the range of 12 to 40 hours to afford 1-(3-iodophenyl)urea;
b) Adding diphenylphosphine and triethylamine to the solution of compound of step (a) in solvent followed by refluxing the reaction mixture in presence of a catalyst at temperature in the range of 69 to 72° C. for the period in the range of 16 to 18 hrs;
c) Adding potassium cyanate dissolved in water to the reaction mixture of acid compound dissolved in hydrochloric acid and diluted with water followed by stirring at temperature in the range of 28 to 35° C. for the period in the range of 12 to 40 hours to afford carboxylate ligand;
d) Adding metal compound and ligand of step (b) to the carboxylate ligand of step (c) followed by stirring the reaction mixture at room temperature in the range of 28 to 35° C. for the period in the range of 1 to 16 hours to afford self-assembled catalyst of formula (I).

In another embodiment, the present invention provides a one pot process for the preparation of self-assembled catalyst of formula (I) comprising the steps of:
a) adding potassium cyanate dissolved in water to the reaction mixture of aniline compound dissolved in hydrochloric acid and diluted with water followed by stirring at temperature in the range of 28 to 35° C. for the period in the range of 12 to 40 hours to afford 1-(3-iodophenyl)urea;

b) adding diphenylphosphine and triethylamine to the solution of compound of step (a) in solvent followed by refluxing the reaction mixture in presence of [Pd(OAc)$_2$] as a catalyst at temperature in the range of 69 to 72° C. for the period in the range of 16 to 18 hrs;

c) adding potassium cyanate dissolved in water to the reaction mixture of acid compound dissolved in hydrochloric acid and diluted with water followed by stirring at temperature in the range of 28 to 35° C. for the period in the range of 12 to 40 hours to afford carboxylate ligand;

d) adding [Pd(COD)MeCl] and ligand of step (b) to the carboxylate ligand of step (c) followed by stirring the reaction mixture at room temperature in the range of 28 to 35° C. for the period in the range of 1 to 16 hours to afford self-assembled catalyst of formula (I).

In preferred embodiment, said solvent in step (b) is selected from tetrahydrofuran (THF), dimethylformamide (DMF) or mixture thereof.

In another preferred embodiment, said aniline compound in step (a) is selected from 3-Iodoaniline, 3-Bromoaniline or 3-Chloroaniline.

In yet another preferred embodiment, said acid compound in step (c) is selected from Metanilic acid, substituted Metanilic acid, 3-amino benzoic acid or substituted 3-amino benzoic acid. The substituent is selected from alkyl, cycloalkyl, halo-substituted alkyl, halo-substituted cycloalkyl, an aryl or halo-substituted aryl or heteroatom substituted halo-aryl.

In still another preferred embodiment, said carboxylate ligand is selected from 3-ureidobenzoic acid (2b) or 3-(3-phenylureido) benzoic acid.

In yet still another preferred embodiment, said metal compound is selected from [Pd(COD)MeCl], [Pd(TMEDA)Me$_2$], [Ni(COD)MeCl], [Ni(TMEDA)Me$_2$] or [Ni(PPh$_3$)$_2$PhCl].

In yet still another preferred embodiment, said carboxylate ligand in step (d) is optionally treated with sodium hydride in THF for 3 to 4 hours at room temperature in the range of 20 to 35° C., followed by dissolved in DMSO.

In yet still another preferred embodiment, said step (d) optionally treated with sodium hydride in THF for 3 to 4 hours followed by dissolved in pyridine.

In yet still another preferred embodiment, said catalyst in step (b) is selected from [Pd(OAc)$_2$], [Pd(OBz)$_2$], [Pd(OTf)] or [Pd(OTs)].

In yet another embodiment, the present invention provides a process for olefin polymerization comprising the steps of: mixing a monomer component comprising one or more polymerizable olefins and an self-assembled catalyst of formula (I) in solvent at a temperature in the range of 30 to 90° C. and at pressure in the range of 1 to 20 bars in a high pressure reactor to afford desired polymer.

In preferred embodiment, said olefins is selected from C$_2$-C$_{30}$ α-olefins, C$_2$-C$_{30}$ functionalized alkenes, cycloalkenes, norborene and derivatives thereof, dienes, acetylenes, styrene, alkenols, alkenoic acids and derivatives or mixtures thereof.

In another preferred embodiment, said olefin is ethylene, propylene, butene, pentene, hexene, 4-methyl-1-pentene, octene, norborene or methacrylate.

In yet another preferred embodiment, said solvent is selected from toluene, xylene, heptane, octane, decane or dodecane.

Figure 1B:
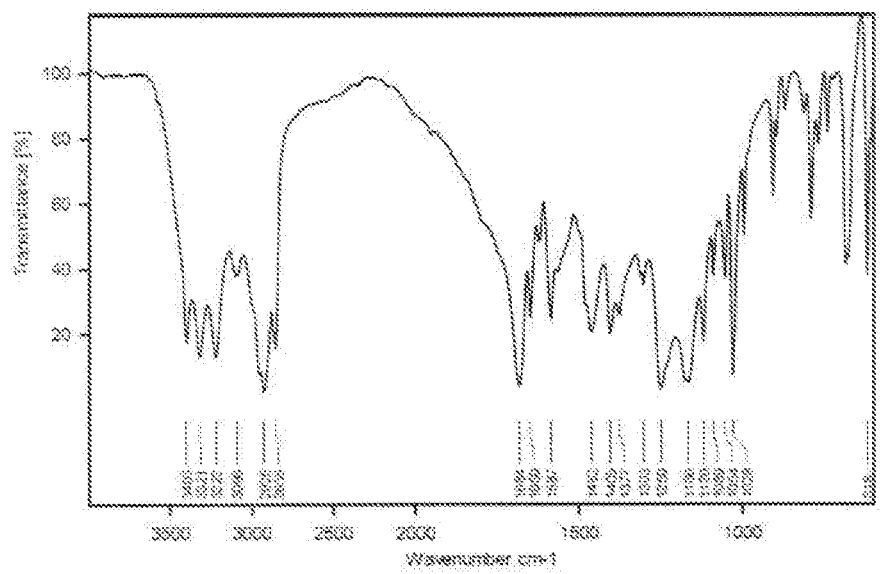
FIG. 1b: IR spectrum of ligand 3-ureidobenzenesulfonic acid (2a).
Figure 2A:
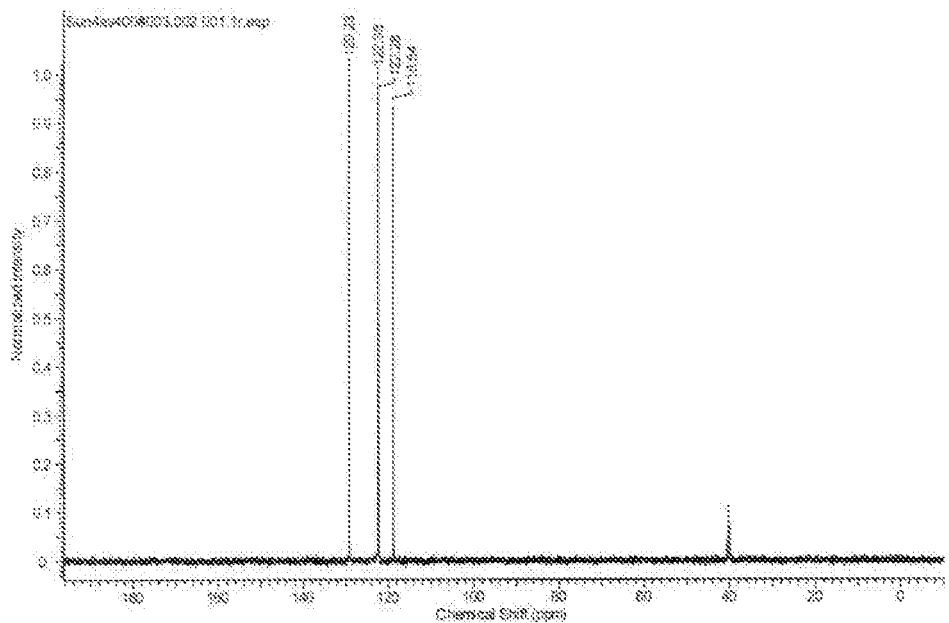
FIG. 2a: DEPT-NMR of ligand 3-ureidobenzoic acid (2b).
Figure 2B:
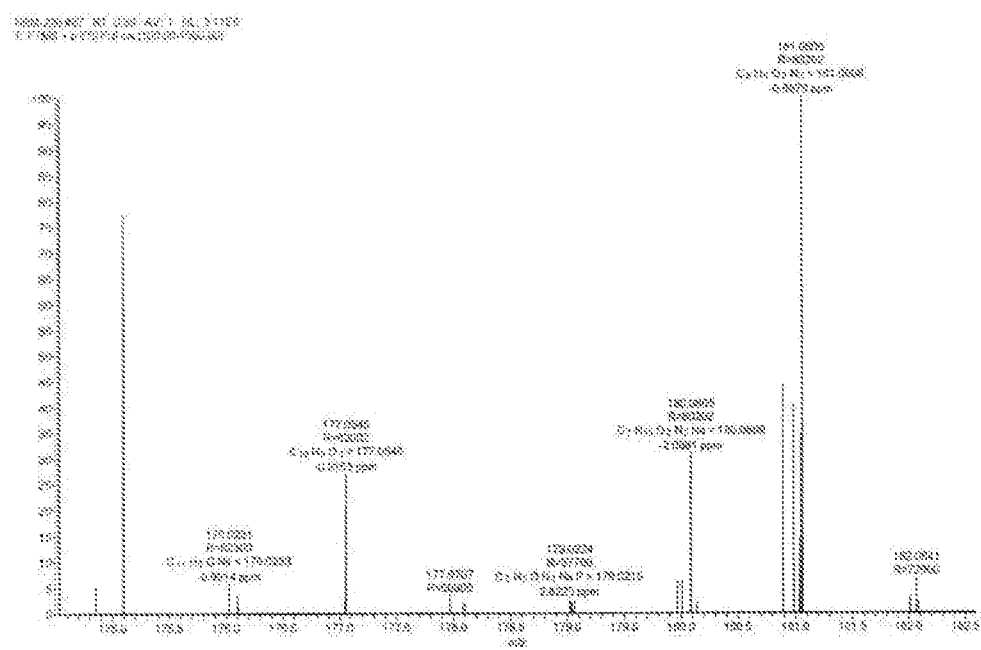
FIG. 2b: ESI-MS spectrum of ligand 3-ureidobenzoic acid (2b).
Figure 3:
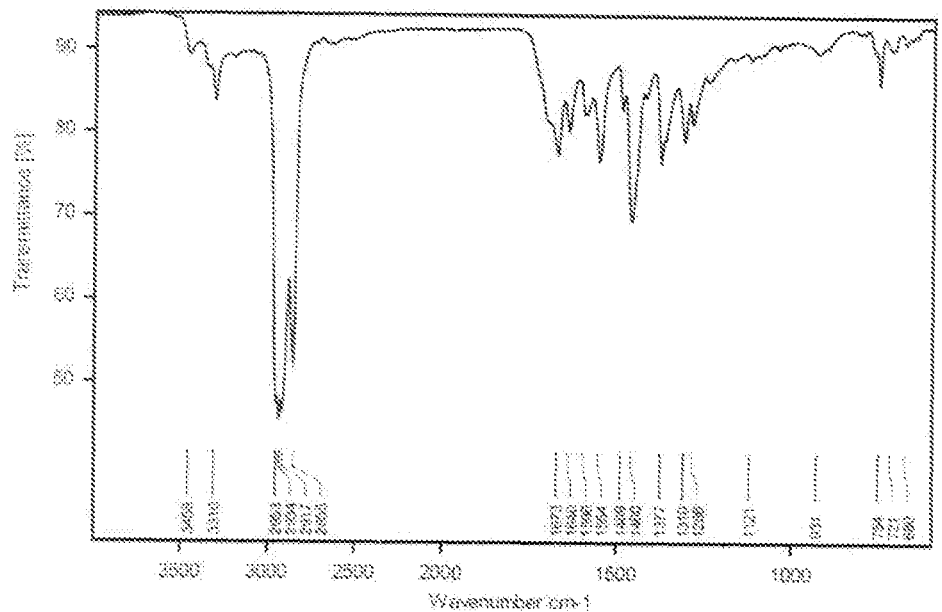
FIG. 3: IR spectrum of ligand 3-ureidobenzoic acid (2b).
Figure 4:
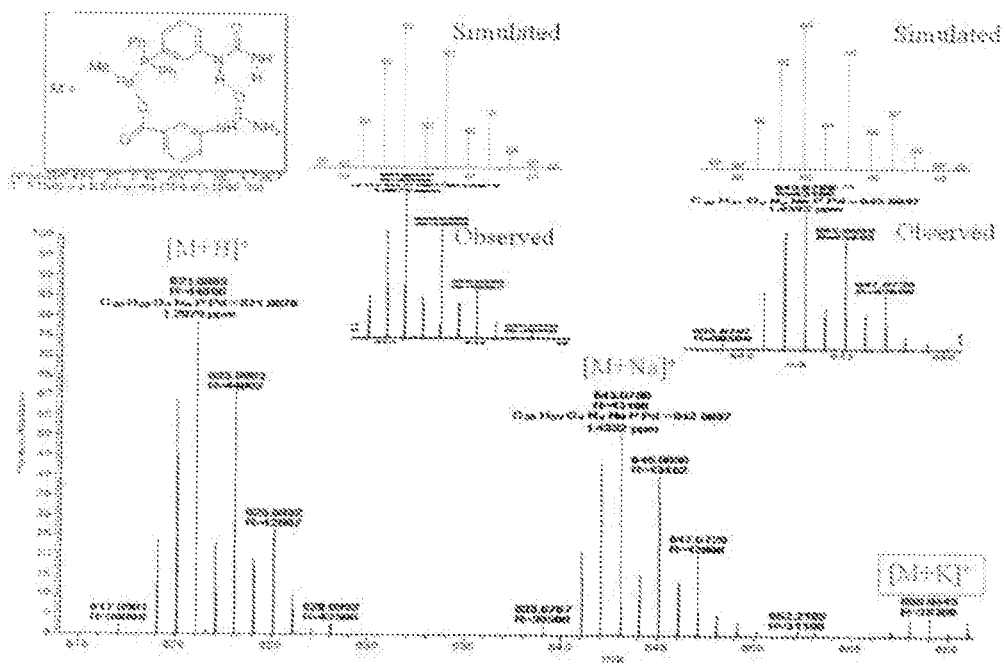
FIG. 4: ESI-MS spectrum of complex [PdMe(2b)(1a)] (4).
Figure 5:
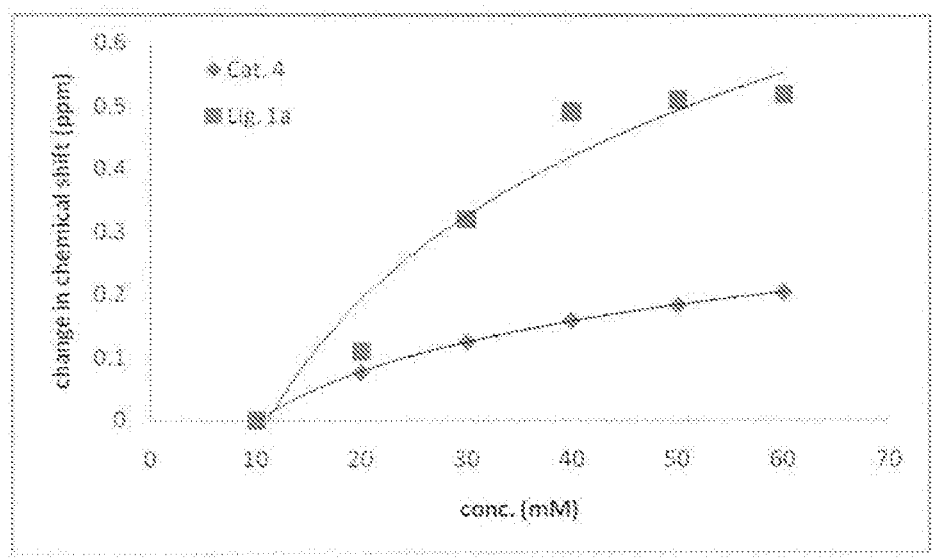
FIG. 5: A plot of change in the chemical shift of the NH proton versus concentration of ligand 2b (red) and Catalyst 4 (blue).

The peak at 1684 in and FIG. 1b the peak at 1673 in FIG. 3 shows that the urea is formed. Further, from FIG. 5 it is observed that the urea protons are involved in the intramolecular hydrogen bonding.

Figures 6A, 6B:
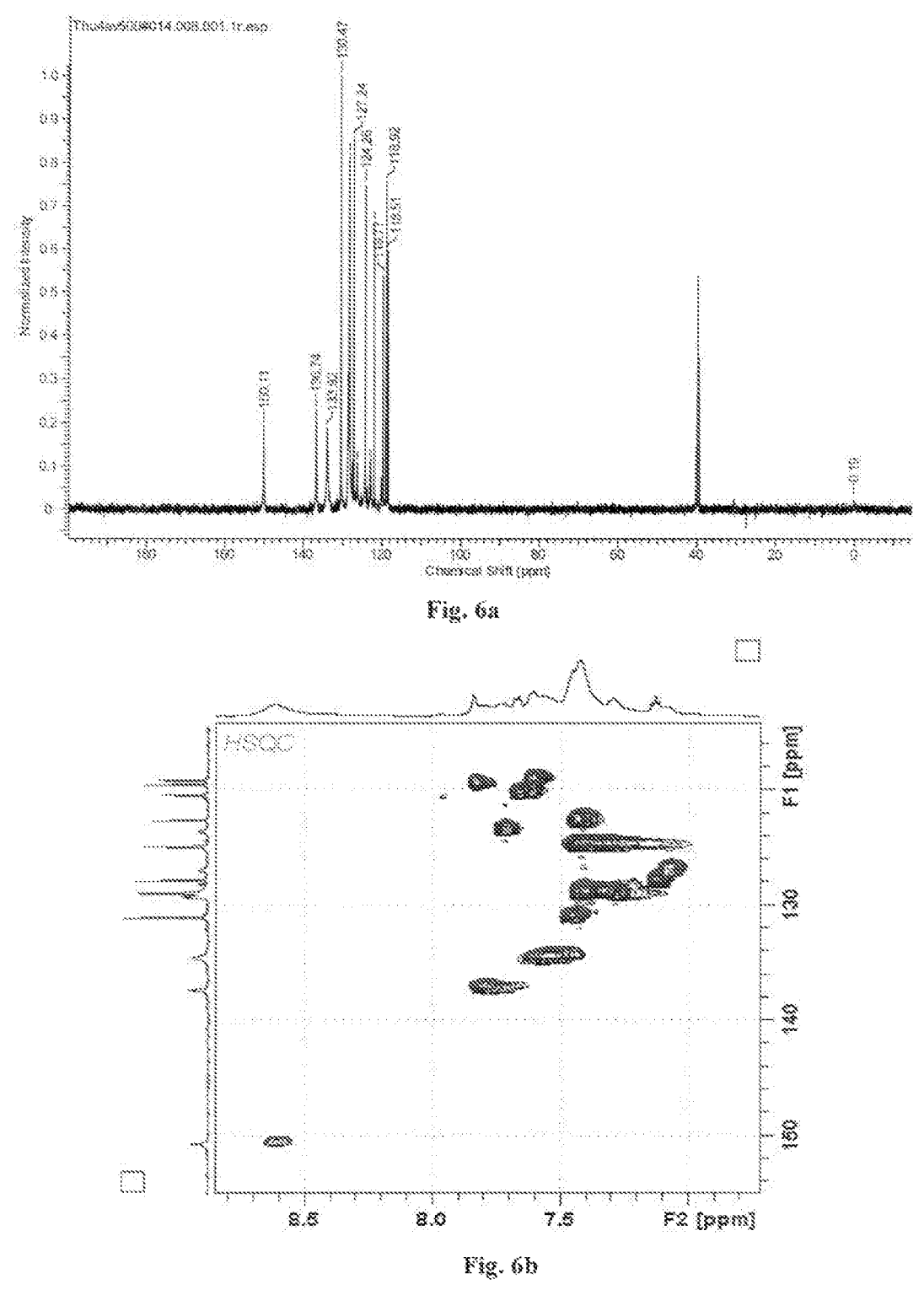
Figure 6C:
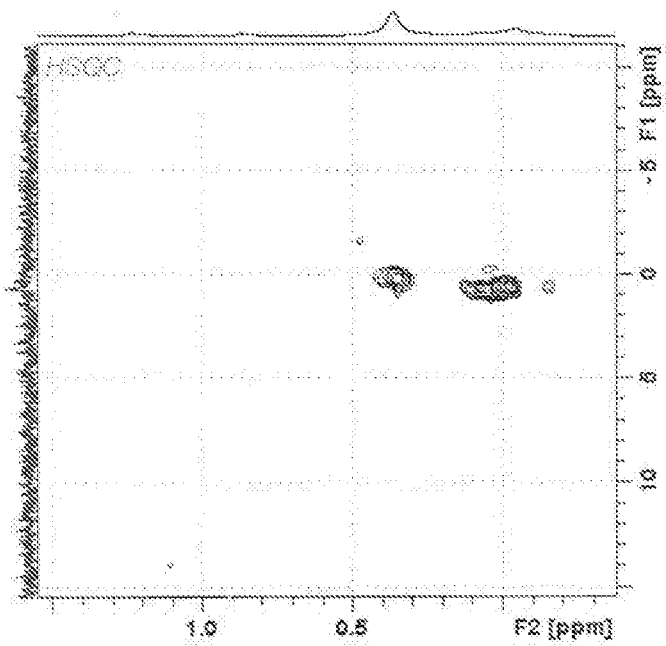
FIG. 6c: HSQC spectrum of complex [PdMe(2b)(1a)(Py)] (5).
Figure 6D:
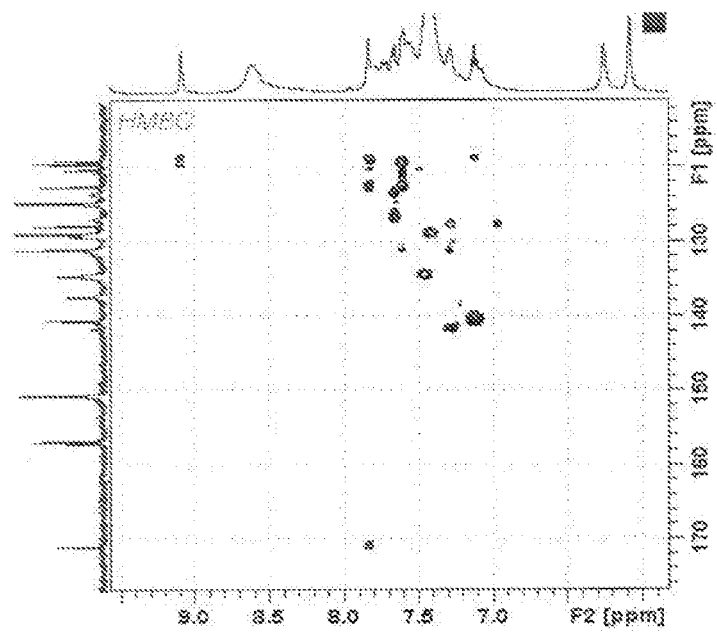
FIG. 6d: HMBC spectrum of complex [PdMe(2b)(1a)(Py)] (5).
Figure 6E:
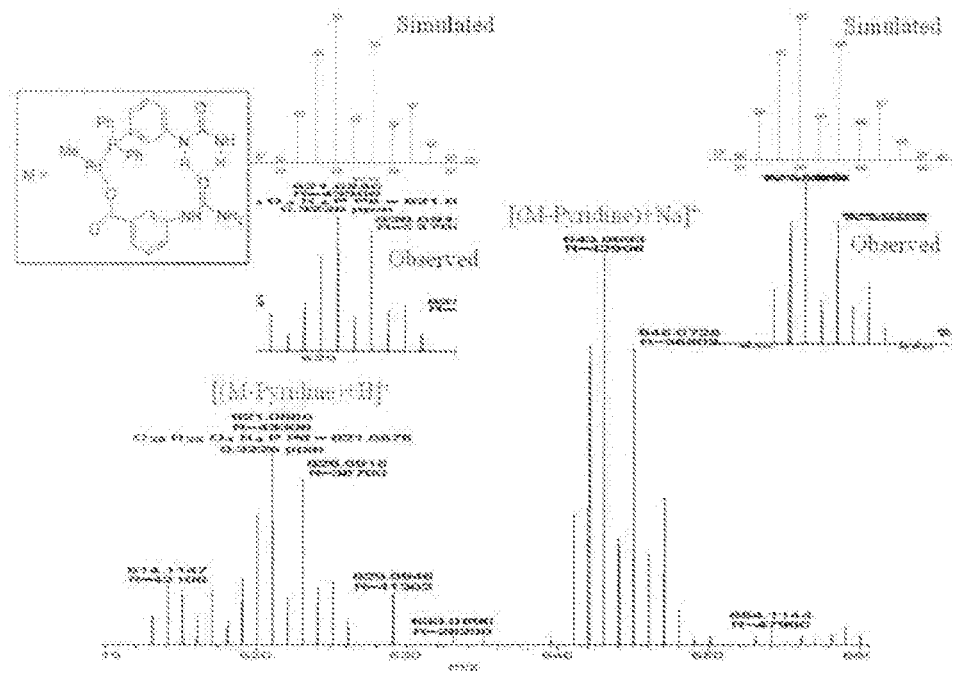
FIG. 6e: ESI-MS spectrum of complex [PdMe(Py)(2b)(1a)] (5).

The FIG. 6b shows the Py-H protons a cross peak with the carbon at 150 ppm and FIG. 6c shows the Pd-Me protons a cross peak with the carbon at 0.19 ppm.

Figure 7:
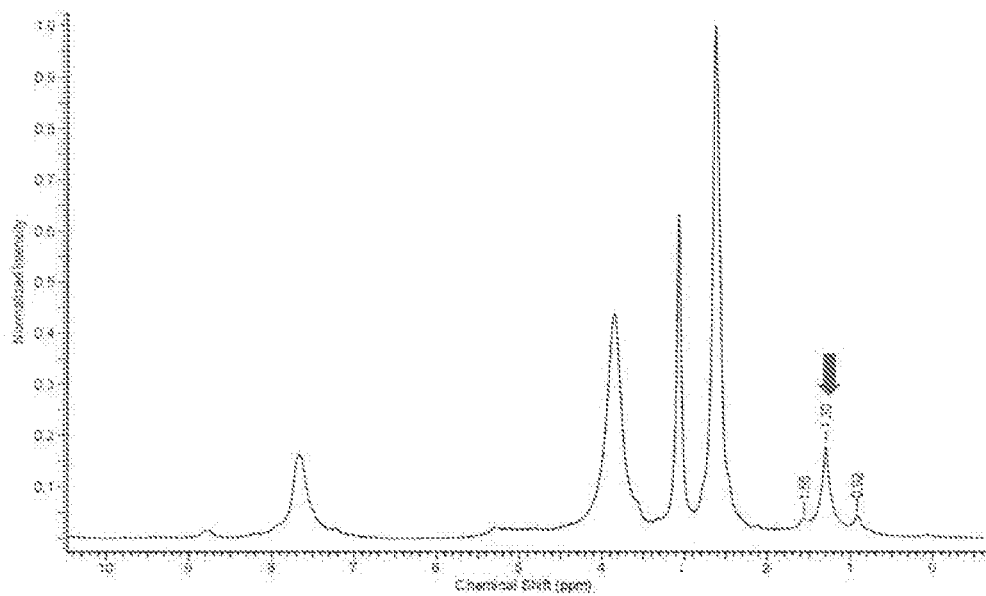
FIG. 7: $^1$H-NMR of polyethylene in DMSO-d$_6$ at room temperature.
Figure 8:
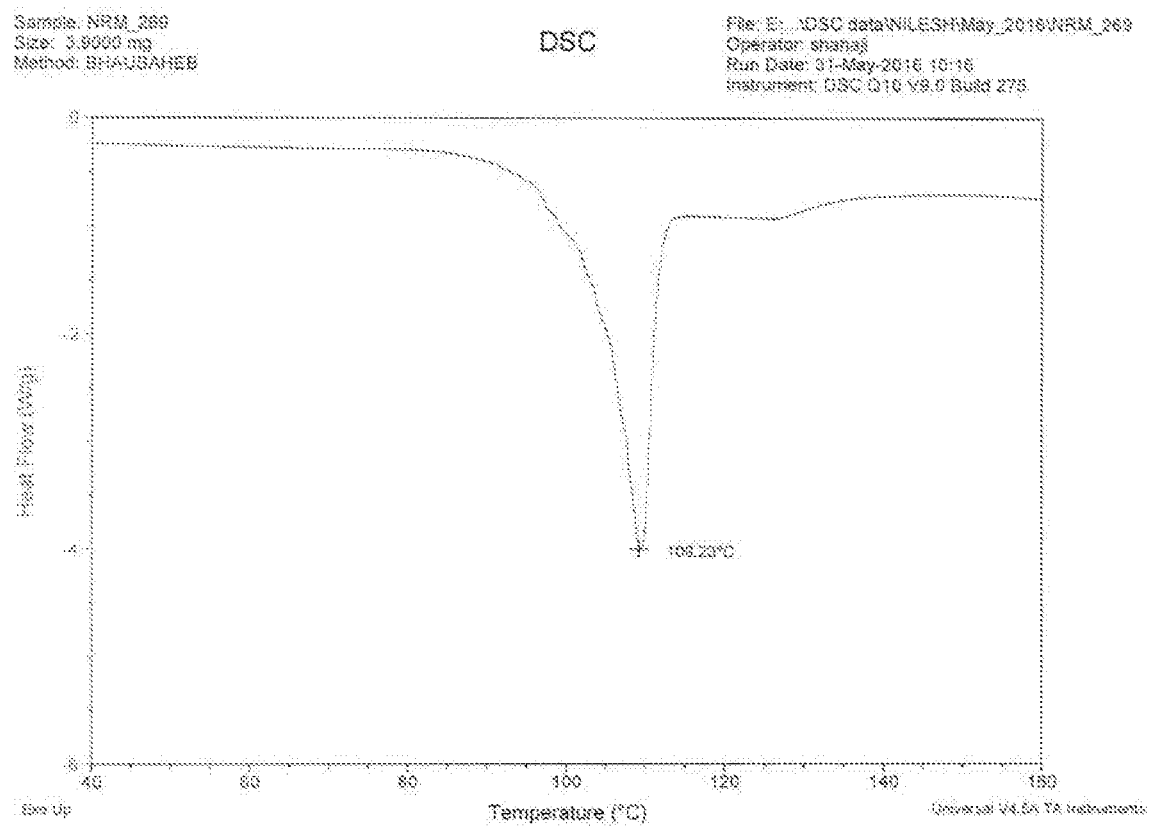
FIG. 8: DSC chromatogram of the thus prepared polyethylene.

From FIGS. 7 and 8 it is observed that the polyethylene is formed and having a melting temperature at 109° C.

The following examples, which include preferred embodiments, will serve to illustrate the practice of this invention, it being understood that the particulars shown are by way of example and for purpose of illustrative discussion of preferred embodiments of the invention.

EXAMPLES

Example 1: Synthesis of Supramolecular Ligands a. 1-(3-(diphenylphosphanyl)phenyl)urea (1a)

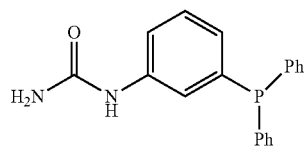

3-Iodoaniline was dissolved in 2M HCl and then diluted with water. KOCN was dissolved in minimum amount of water and added drop wise to the above solution with constant stirring. Reaction mixture was stirred at 35° C. for 12 hours. And then 1-(3-iodophenyl)urea was filtered and washed with toluene. 1-(3-iodophenyl)urea was dissolved in THF/DMF (3:1) and then diphenylphosphine and triethylamine was syringed successively under argon. 0.5 mol % of [Pd(OAc)$_2$] was added as a catalyst and refluxed for 16 hrs at 69° C. Solvent was evaporated and 10 ml of degassed water was added and the organic compound was extracted with ethyl acetate. Ethyl acetate was evacuated and then crude solid was dissolved in dichloromethane and filtered over a plug of SiO$_2$. Plug was washed with dichloromethane to remove impurities and then product was pushed through with ethyl acetate. Faint yellow solid was obtained in 90% yield. $^{31}$P-NMR (500 MHz in DMSO-d$_6$): δ=−5.97. $^1$H-NMR: δ=5.83 (s, 2H, NH$_2$), 6.74 (s, 1H, Ar—H), 7.26 (s, 6H, Ar—H), 7.40 (s, 6H, Ar—H), 7.53 (s, 1H, Ar—H), 8.57 (s, 1H, NH).

b. 3-ureidobenzenesulfonic Acid (2a)

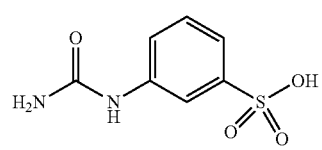

Metanilic acid (23 mmol) was dissolved in 2M hydrochloric acid (12 ml) and diluted with 100 ml of water. Potassium cyanate (KOCN) (29.9 mmol) was dissolved in minimum amount of water and added drop wise in the above solution with constant stirring at room temperature (35° C.) for 40 hrs. After completion of reaction, water was evacuated and the remaining solid was crystallized from hot water in 52% yield. $^1$H-NMR (400 MHz in DMSO-d$_6$): δ=10.03 (s, 1H exchanges with D$_2$O), 8.86 (s, 1H broad), 6.94 (s, 2H broad), 7.70 (s, 1H, Ar—H), 7.39 (d, 1H, Ar—H), 7.28 (m, 2H, Ar—H). $^{13}$C-NMR (100 MHz in DMSO-d$_6$): δ=155.54 (C=O), 147.66 (C—S), 140.64 (C—N), 128.64 (CH), 118.90 (CH), 118.77 (CH), 115.52 (CH). IR (cm$^{-1}$)=3403 (broad for OH), 1664 (C=O). ESI-MS (+ve): m/z calculated for [C$_7$H$_9$O$_4$N$_2$S]$^+$ 217.028; m/z found 217.027 [M+H]$^+$; Molecular Formula C$_7$H$_9$O$_4$N$_2$S. ESI-MS(−ve) calculated for [C$_7$H$_7$O$_4$N$_2$S]$^-$ m/z=215.012 [M−H]$^-$.

c. 3-ureidobenzoic Acid (2b)

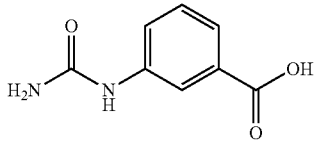

2b 3-amino benzoic acid (7.2 mmol) was dissolved in 2M hydrochloric acid (20 ml) and diluted with water (100 ml). potassium cyanate (KOCN) (29 mmol) was dissolved in minimum amount of water and added drop wise to the above solution with constant stirring at room temperature (35° C.) for 40 hours. The formed precipitate was separated by filtration. The resultant solid was crystallized from methanol yielded 51%. $^1$H-NMR (500 MHz in DMSO-d$_6$): δ=12.87 (s, 1H), 8.87 (s, 1H), 8.08 (s, 1H), 7.61 (d, 1H, Ar—H), 7.49 (d, 1H, Ar—H), 7.39 (m, 1H, Ar—H), 5.97 (s, 2H). $^{13}$C-NMR (100 MHz in DMSO-d$_6$): δ=167.88, 156.41, 141.30, 131.61 (CH), 129.23 (CH), 122.37 (CH), 118.84 (CH). IR (cm$^{-1}$)=3310 (broad for OH), 1673 (C=O). ESI-MS: m/z calculated for [C$_8$H$_9$O$_3$N$_2$]$^+$ 181.06; m/z found 181.06 [M+H]$^+$; m/z calculated for [C$_8$H$_8$N$_2$NaO$_3$]$^+$ 203.04; m/z found 203.04 [M+Na]$^+$.

Example 2: Palladium Complex [PdMe(2b)(1a)] (4)

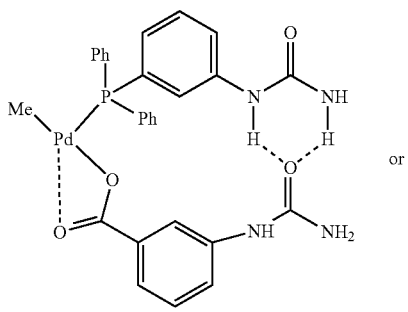

4 or

4'

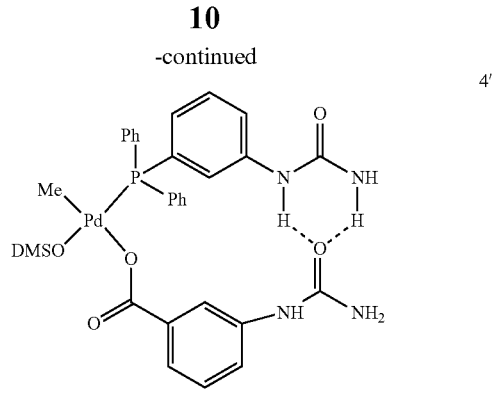

Ligand 2b (0.44 mmol) was treated with sodium hydride in THF for 3 hours at 35° C. After evaporation of THF, the sodium salt of ligand 2b was dissolved in DMSO followed by the addition of [Pd(COD)MeCl] (0.44 mmol) and ligand 1a (0.44 mmol). The reaction mixture was stirred at 35° C. for 16 hours. Resulting yellow brown solution was passed through the bed of celite under argon. After the evaporation of solvent a gray solid was obtained. $^{31}$P-NMR (500 MHz in DMSO-d$^6$): δ=37.21 (broad). $^1$H-NMR: δ=0.41 (s, 3H, Pd-Me), 5.92 (s, 2H, NH$_2$), 6.05 (s, 2H, NH$_2$), 7.14 (m broad, 2H, Ar—H), 7.33 (s, 3H, Ar—H), 7.48 (s, 6H, Ar—H), 7.55 (s, 5H, Ar—H), 7.69 (s, 1H, Ar—H), 7.82 (s, 1H, Ar—H), 8.77 (s, 1H, NH), 9.14 (s, 1H, NH). ESI-MS: for [C$_{28}$H$_{28}$O$_4$N$_4$PPd]$^+$ m/z=621.0885 [M+H]$^+$; for [C$_{28}$H$_{27}$O$_4$N$_4$NaPPd]$^+$ m/z=643.0706 [M+Na]$^+$.

Example 3: Palladium Complex [PdMe(2b)(1a)(Py)] (5)

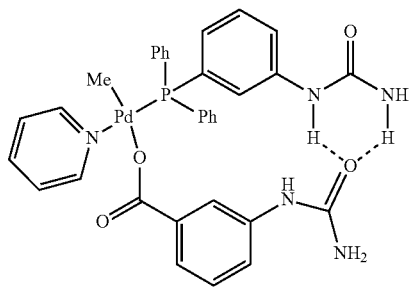

5

Ligand 2b (0.14 mmol) was treated with sodium hydride in THF for 3 hours at room temperature (35° C.). After evaporation of THF, pyridine was added, followed by the addition of [Pd(COD)MeCl] (0.14 mmol) and ligand 1a (0.14 mmol). This reaction mixture was stirred at 35° C. for 16 hours. Yellow solid was obtained after evaporation of solvent. Solid was dissolved in DMSO and passed through the bed of celite which produces yellow brown solid in 79% yield. $^{31}$P-NMR (500 MHz in DMSO-d$_6$): δ=39.10 (broad), $^1$H-NMR: δ=0.36 (s, 3H, Pd-Me), 6.08 (s, 2H, NH$_2$), 6.25 (s, 2H, NH$_2$), 7.12 (m, 2H, Ar—H), 7.29 (m, 2H, Ar—H), 7.41 (m, 8H, Ar—H), 7.60 (m, 4H, Ar—H), 7.68 (m, 1H, Ar—H), 7.75 (m, 1H, Ar—H), 7.83 (m, 2H, Ar—H), 8.61 (s broad, 3H, Py-H), 9.09 (s, 1H, NH), 9.60 (s, 1H, NH). $^{13}$C-NMR: δ=0.19 (Pd-Me), 118.51, 118.92, 119.90, 122.03, 123.90, 124.25, 126.39, 127.24, 128.40, 130.47, 133.95, 136.76, 139.95, 141.17, 150.11 (Pyridine CH), 156.23 (Urea (C=O), 156.44 (Urea C=O), 170.53 (Carboxylate C=O).

ESI-MS (+ve): for [C$_{28}$H$_{28}$O$_4$N$_4$PPd]$^+$ m/z=621.0880 [M-Py+H]$^+$; for [C$_{28}$H$_{27}$O$_4$N$_4$NaPPd]$^+$ m/z=643.0698 [M-Py+Na]$^+$; for [C$_{28}$H$_{27}$O$_4$N$_4$KPPd]$^+$ m/z=659.0436 [M-Py+K]$^+$.

Example 4: Failed Experiment—Palladium Complex [PdMe(TMEDA)(1a)](2a) (6)

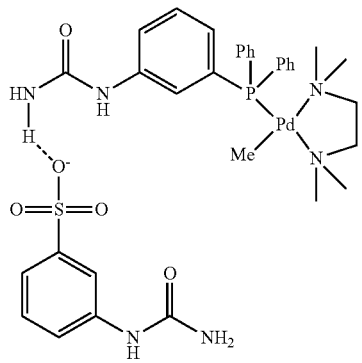

Ligand 2a (0.63 mmol) and ligand 1a (0.63 mmol) and [Pd(TMEDA)Me$_2$] (0.63 mmol) was taken in a schlenk tube in a glove box and DMSO (2 ml) was added and stir it at 35° C. for 1 hr. Initially methane bubbling was clearly observed. Excess of THF (8 ml) was added to the reaction mixture for precipitation. Yellow solid precipitate was observed after keeping at room temperature (35° C.) for 16 hrs overnight. Precipitate was separated through cannula and dried under reduced pressure yielded 93%. Crystallized from DMSO: acetonitrile.

Example 5: Ethylene Polymerization Using [PdMe(2b)(1a)] (4)

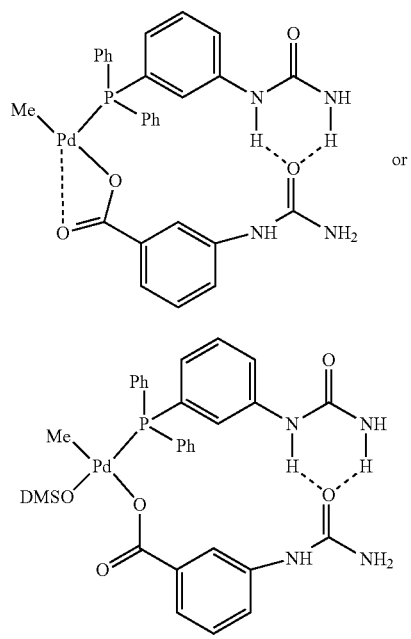

Ethylene polymerization was carried out in a 250 ml stainless steel high pressure reactor equipped with mechanical stirrer and heating/cooling jacket. Prior to the experiment, the reactor was heated in vacuum to 90° C. for 30 minutes, cooled to room temperature and was filled with argon. Reactor was flushed with ethylene (3 times 12 bars) and was charged with appropriate quantity of toluene under positive ethylene stream. Next, the reactor was pressurized to 10 bars and saturated with ethylene for 30 minutes at desired reaction temperature (as in table 1). After cooling at room temperature, catalyst 4 solution (25 mg, 0.5 ml DMSO+2 ml DCM) was introduced into the reactor at room temperature. The reactor was then pressurized to 10 bars with stirring. The polymerization was generally carried out for 6 hours, the excess ethylene was slowly vented off and the reactor was allowed to cool down to room temperature. The resultant solution was quenched with acidic methanol solution. Solid was obtained after evaporating the solvents in vacuum which was further dried under reduced pressure at 60° C. for 10 hours. The resultant polyethylene was characterized using $^1$H-NMR spectroscopy and DSC.

TABLE 1

Ethylene Polymerization using supramolecular DMSO coordinated Palladium (II) Catalyst 4 and 6$^a$:

| Entry | Temp. (° C.) | Press. (bar) | Time (hr) | Yield (g) | TOF | Tm° C. |
|---|---|---|---|---|---|---|
| 1. | 60 | 10 | 6 | 0.011 | 1.87 | — |
| 2 | 70 | 10 | 6 | 0.021 | 3.57 | 125 |
| 3 | 80 | 10 | 6 | 0.020 | 3.40 | 112 |
| 4 | 90 | 10 | 6 | 0.022 | 3.74 | ND |
| 5 | 90 | 10 | 1 | 0.010 | 10.20 | ND |
| 6$^\#$ | 90 | 10 | 1 | NO | — | — |
| 7 | 90 | 20 | 1 | 0.016 | 16.3 | ND |
| 8 | 70 | 10 | 1 | 0.103 | 105.10 | 109 |
| 9* | 70 | 5 | 1 | NO | — | — |

$^a$Conditions: Catalyst 4 = 0.035 mmol in DMSO + DCM (0.5 + 2 ml), toluene = 100 ml;
$^\#$without DMSO;
*Catalyst 6.

Advantages of Invention

1) The ligand synthesis is a single step process and avoids tedious protocols.
2) The complex preparation is also straight forward and is achieved in a single step.
3) Insertion polymerization of ethylene or other olefins has reported using supramolecular catalysts.

The invention claimed is:
1. A self-assembled catalyst of formula (I);

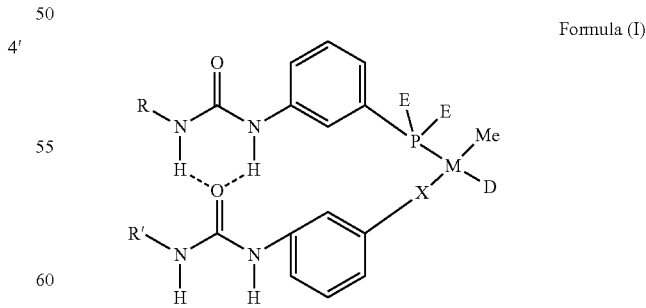

Formula (I)

Wherein:
a dotted line (---) between H and O atoms indicates a hydrogen bond;
M is selected from Pd and Ni;
X is selected from SO$_3^-$, CO$_2^-$, and O$^-$;

R and R' is selected from H and Ph;

D is selected from dimethyl sulfoxide (DMSO), pyridine, lutidine, acetonitrile, dimethylformamide, acetone, benzonitrile, triphenylphosphine, triphenylphosphineoxide, pyridone or piperidine;

E is selected from hydrogen, alkyl, cycloalkyl, aryl, and mono and disubstituted aryl.

2. The catalyst as claimed in claim 1, wherein said E is selected from cyclohexane, 2-methoxybenzene, 2-ethoxybenzene, 2-methylbenzene, 2-ethylbenzene, 2,6-dimethoxybenzene, 2-isopropylbenzene, 2-t-butylbenzene, 2,6-diflurobenzene, 3,5-triflurobenzene, and pentaflurobenzene.

3. The catalyst as claimed in claim 1, wherein said self-assembled catalyst of formula (I) is selected from

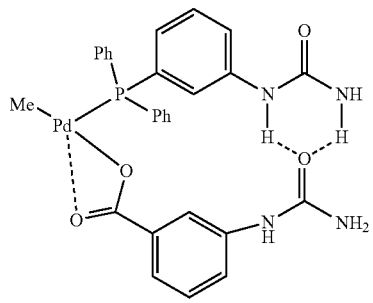

(4),

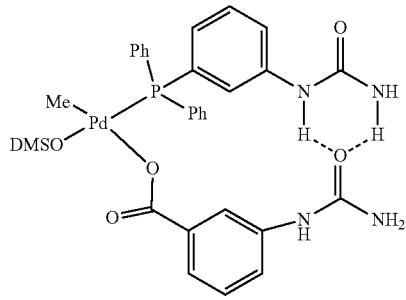

(4') where DMSO is dimethyl sulfoxide, and

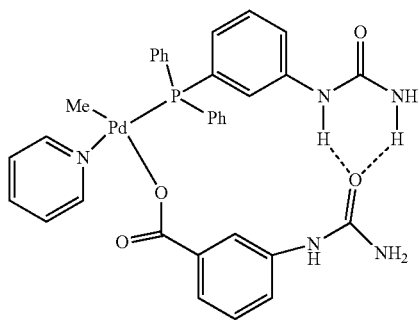

(5).

4. A one-pot process for the preparation of self-assembled catalyst of formula (I) as claimed in claim 1, wherein said process comprising the steps of:
a) adding diphenylphosphine and triethylamine to a solution of an aniline compound selected from 3-Iodoaniline, 3-Bromoaniline and 3-Chloroaniline in solvent followed by refluxing the reaction mixture in presence of a catalyst at temperature in the range of 69 to 72° C. for the period in the range of 16 to 18 hours to form the ligand of step (a), 1-(3-(diphenylphosphanyl)phenyl) urea;
b) adding potassium cyanate dissolved in water to the reaction mixture of acid compound, where the acid compound is selected from metanilic acid, substituted metanilic acid, 3-amino benzoic acid, and substituted 3-amino benzoic acid and the substituent are selected from alkyl, cycloalkyl, halo-substituted alkyl, halo-substituted cycloalkyl, aryl, and halo-substituted aryl, dissolved in hydrochloric acid and diluted with water followed by stirring at temperature in the range of 28 to 35° C. for the period in the range of 12 to 40 hours to afford carboxylate ligand selected from 3-ureidobenzoic acid (2b) or 3-(3-phenylureido) benzoic acid;
c) adding a metal compound selected from selected from [Pd(COD)MeCl], [Pd(TMEDA)Me$_2$], [Ni(COD)MeCl], [Ni(TMEDA)Me$_2$], and [Ni(PPh$_3$)$_2$PhCl], and ligand of step (a) to the carboxylate ligand of step (b) followed by stirring the reaction mixture at room temperature in the range of 28 to 35° C. for the period in the range of 1 to 16 hours to afford self-assembled catalyst of formula (I).

5. The process as claimed in claim 4, wherein a catalyst in step (a) is selected from [Pd(OAc)$_2$], [Pd(OBz)$_2$], [Pd(OTf)], and [Pd(OTs)].

6. The process as claimed in claim 4, wherein said solvent in step (a) is selected from tetrahydrofuran (THF), dimethylformamide (DMF), and mixture thereof.

7. A process for olefin polymerization comprising the steps of: mixing a monomer component comprising one or more polymerizable olefins and a self-assembled catalyst of formula (I) as claimed in claim 1 in solvent at a temperature in the range of 30 to 90° C. and at pressure in the range of 1 to 20 bars in a high pressure reactor to afford desired polymer.

8. The process as claimed in claim 7, wherein said olefins is selected from C$_2$-C$_{30}$ α-olefins, C$_2$-C$_{30}$ functionalized alkenes, cycloalkenes, norborene and derivatives thereof, dienes, acetylenes, styrene, alkenols, and alkenoic acids, and mixtures thereof.

9. The process as claimed in claim 7, wherein said olefin is ethylene, propylene, butene, pentene, hexene, 4-methyl-1-pentene, octene, norborene or methacrylate.

* * * * *